June 28, 1966   H. U. LIEBERHERR   3,257,797
TANDEM SUPERCHARGING SYSTEM
Filed May 19, 1964   8 Sheets-Sheet 1
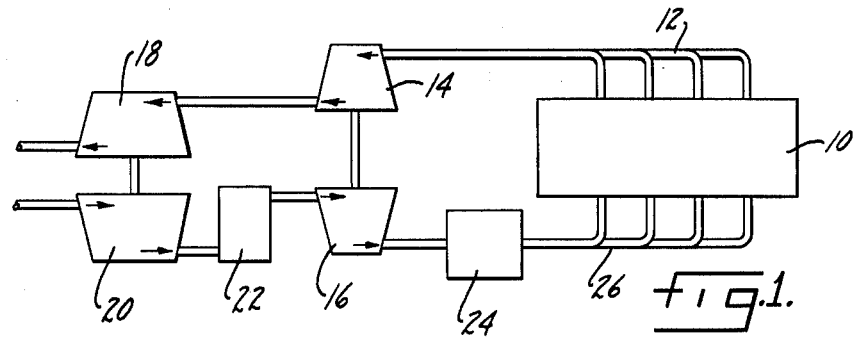
fig.1.
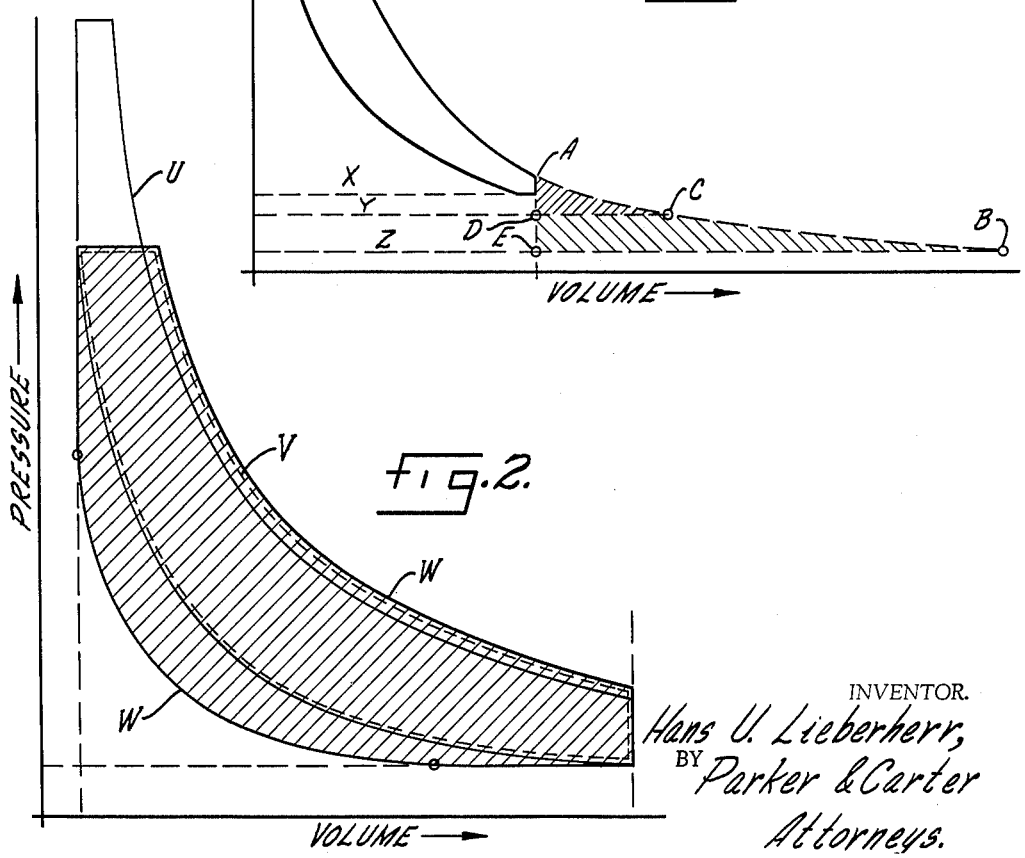
fig.3.
fig.2.
INVENTOR.
Hans U. Lieberherr,
BY Parker & Carter
Attorneys.

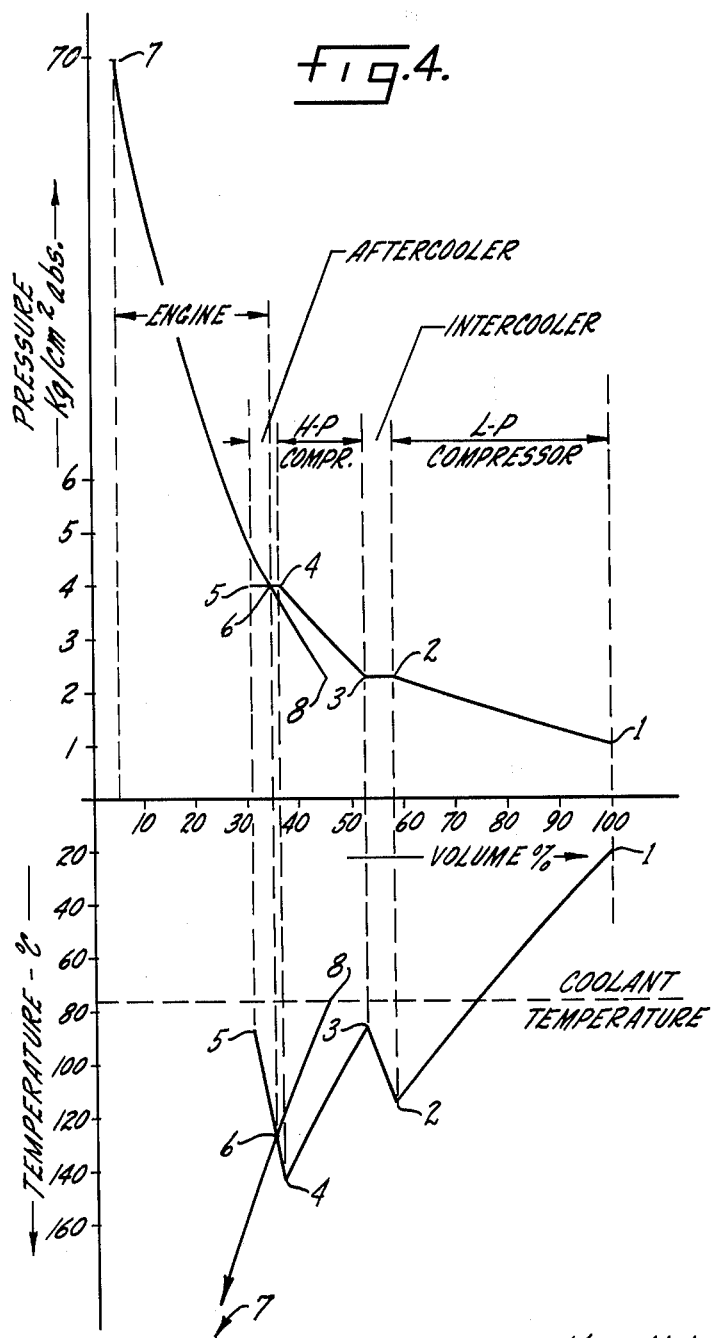

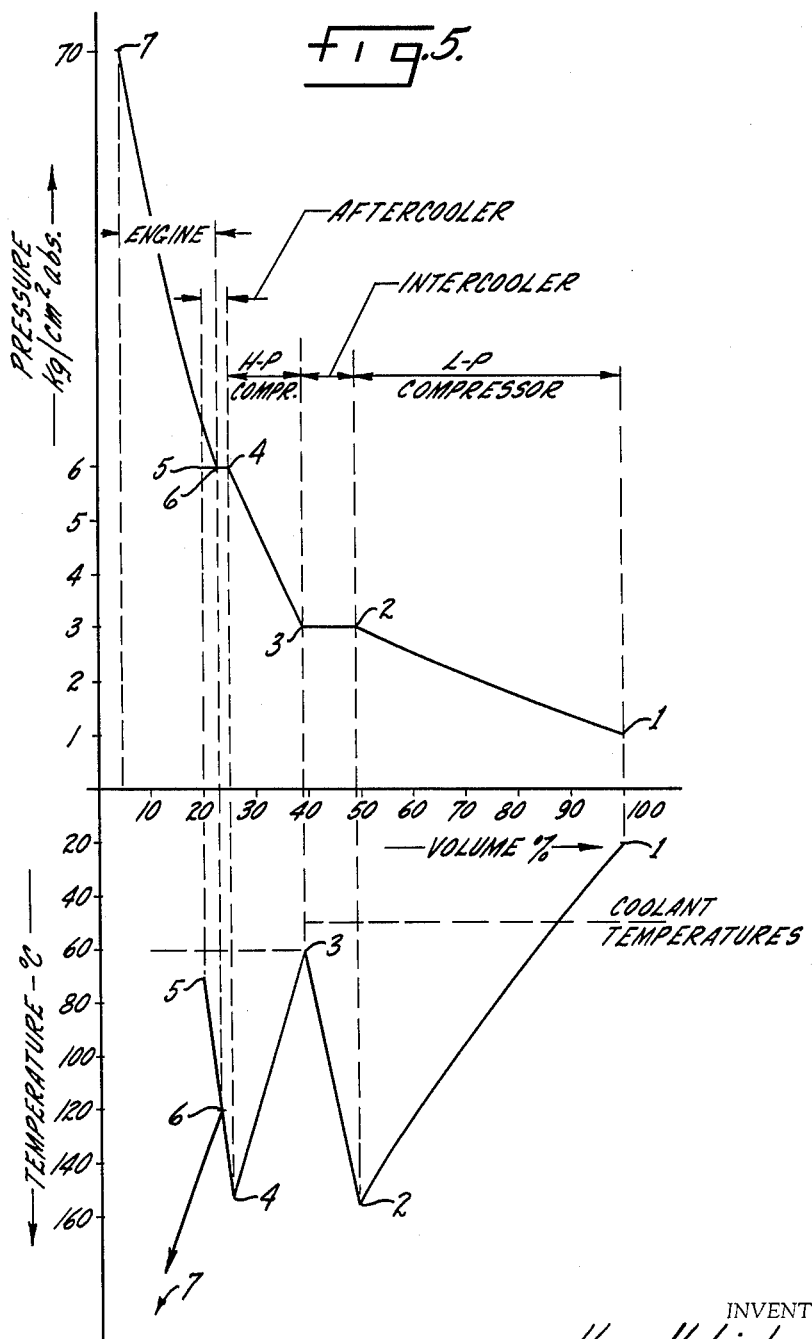

June 28, 1966 H. U. LIEBERHERR 3,257,797
TANDEM SUPERCHARGING SYSTEM
Filed May 19, 1964 8 Sheets-Sheet 4

INVENTOR.
Hans U. Lieberherr,
BY Parker & Carter
Attorneys.

June 28, 1966  H. U. LIEBERHERR  3,257,797
TANDEM SUPERCHARGING SYSTEM
Filed May 19, 1964  8 Sheets-Sheet 5

INVENTOR.
Hans U. Lieberherr,
BY Parker & Carter
   Attorneys.

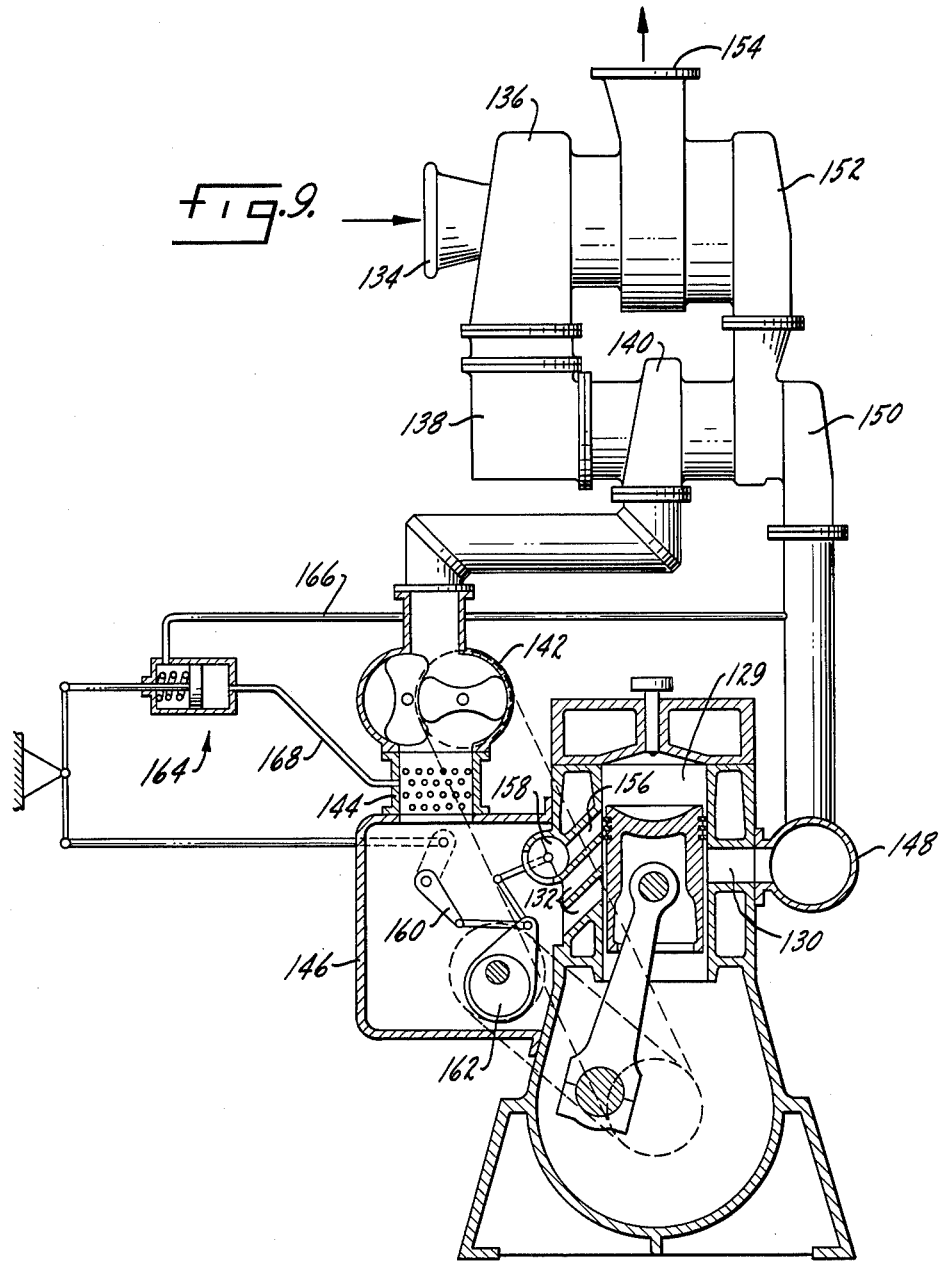

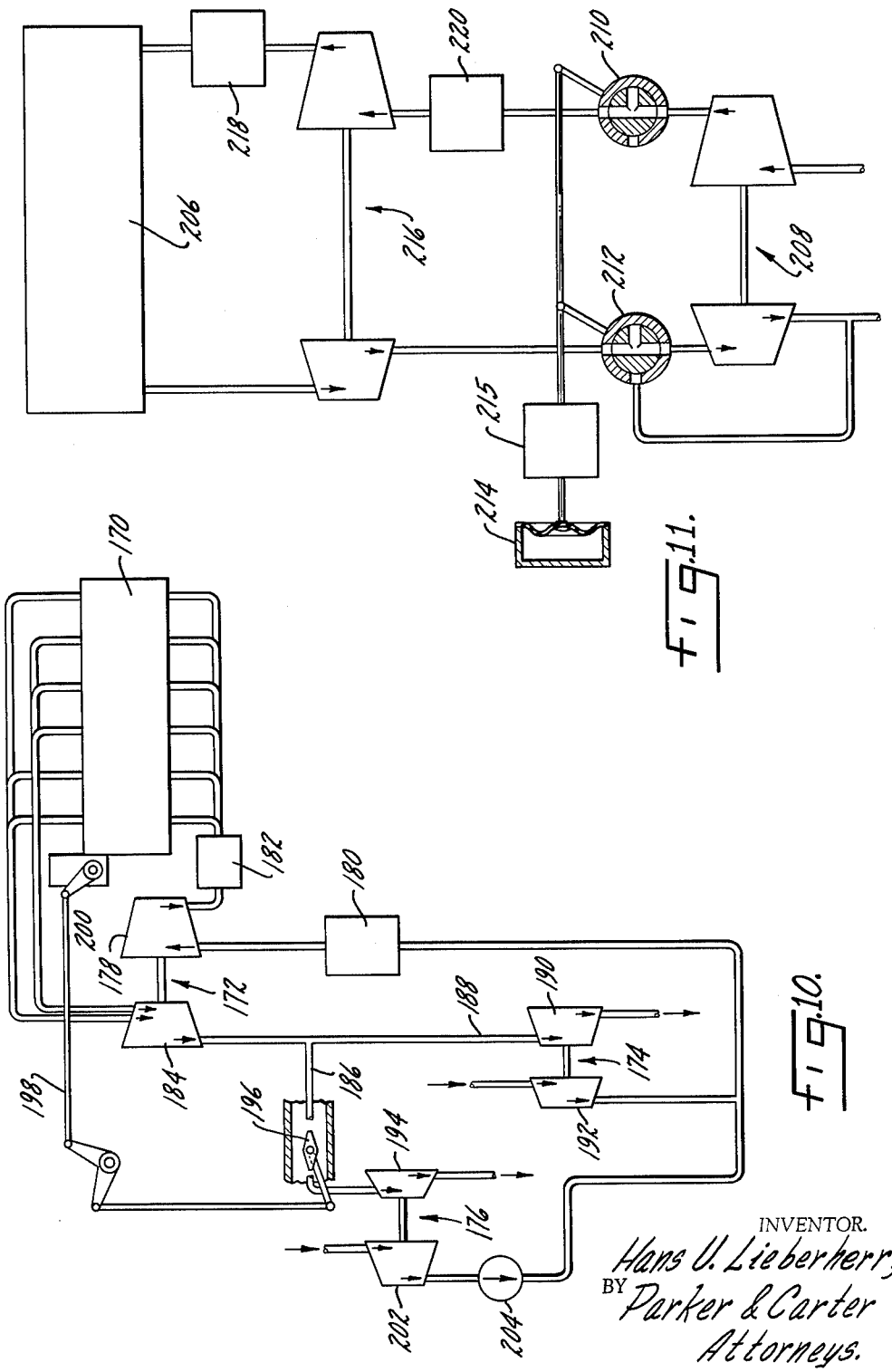

INVENTOR.
Hans U. Lieberherr,
BY Parker & Carter
Attorneys.

United States Patent Office 3,257,797
Patented June 28, 1966

3,257,797
TANDEM SUPERCHARGING SYSTEM
Hans U. Lieberherr, Paris, France, assignor, by mesne assignments, to Nordberg Manufacturing Company, Milwaukee, Wis., a corporation of Wisconsin
Filed May 19, 1964, Ser. No. 368,632
Claims priority, application France, Nov. 14, 1963, 953,787, Patent 1,397,178
20 Claims. (Cl. 60—13)

This invention is concerned with supercharging internal combustion engine and is more specifically concerned with engines having exhaust driven superchargers.

A primary object of the invention is a supercharged internal combustion engine having two or more free running turbochargers.

Another object is an engine of the above type constructed to make the turbochargers effective over a greater portion of the load range.

Another object is an engine of the above type constructed to supply exhaust gases at higher temperatures to sustain the turbochargers.

Another object is an engine of the above type with various ways to increase the energy available in the exhaust gases to drive the turbochargers.

Another object is an engine of the above type in which the high pressure turbine is of the pulse type and the low pressure turbine is of the constant pressure type.

Another object is an engine of the above type in which two or more low pressure turbochargers are used in parallel with each other and in series with a single high pressure turbocharger.

Another object is an engine of the above type having an aftercooler between the high pressure compressor and the engine which is operated in series with the engine jacket water cooling system.

Another object is an engine of the above type which allows the high pressure turbine to be designed with an inlet orifice dimensioned so that no reflected pressure waves are created.

Another object is an engine of the above type which may be operated on the diesel cycle, the dual fuel cycle with pilot fuel injection, or the gas fuel spark-fired cycle.

Other objects will appear from time to time in the ensuing specification and drawings in which:

FIGURE 1 is a diagrammatic showing of an engine with my invention;

FIGURE 2 is a pressure volume diagram showing a portion of the cycle;

FIGURE 3 is a pressure volume diagram showing another portion of the cycle;

FIGURE 4 is a diagram showing cylinder temperatures and pressures plotted against cylinder volume in the cycle;

FIGURE 5 is a diagram like FIGURE 4 but showing a different set of conditions;

FIGURE 9 is similar to FIGURE 7 but showing a two cycle engine constructed to operate according to my invention;

FIGURE 10 is a variant form;

FIGURE 11 is a further variation;

Figure 6:
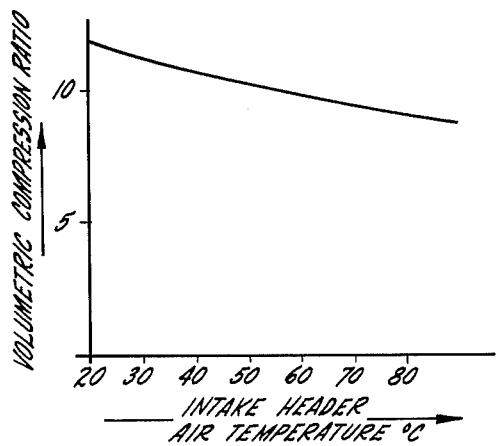
FIGURE 6 is a diagram showing volumetric compression ratio plotted against the temperature of the cylinder intake air in the cycle.

Supercharging internal combustion engines, be they straight compression ignition engines of the diesel type, dual fuel gas engines operating with compression ignition of a small quantity of liquid pilot fuel or spark-fired gas burning engines, but the use of exhaust gas driven turbo-superchargers, has become common practice.

Conventional supercharged engines operate with pressure ratios in their supercharging blower of the order of 1.5/1. Slightly higher ratios are encountered in conjunction with aftercoolers for the compressed air after the supercharger outlet.

High supercharged engines, in present current terminology, are built for supercharging ratios of 2/1 up to 2.5/1; in special cases like high supercharged spark-fired engines, ratios up to 3/1 have been utilized. In all these solutions an aftercooler is necessary and the output of the engine is greatly influenced by the availability of coolant of sufficiently low temperature. This inconvenience goes so far that in many applications, due to insufficient aftercooling, the high supercharged engine does not present appreciable advantages over the conventional normally supercharged engine.

Although the advantages of still higher supercharging ratios are theoretically well recognized, no such engines have found any practical application up to now.

As an example, by teaming an existing engine with a supercharger, all absolute pressures in the working cycle increase in the proportion of the supercharger ratio, so that also the means indicated pressure of the pressure-volume diagram is correspondingly increased. Thus, by applying a 2/1 pressure ratio supercharger to a non-supercharged engine operating for instance at 7 kg./cm.$^2$ mean indicated pressure and 60 kg./cm.$^2$ maximum absolute pressure, a mean indicated pressure of 14 kg./cm.$^2$ at a maximum pressure of 120 kg./cm.$^2$ abs. will be attained. It is obvious that mechanical load on the various elements of the engine will set a fast limit to increased conventional supercharging.

The ratio of the maximum cylinder pressure to the mean indicated pressure, in the present case 120:14=8.6 and that of the maximum pressure to the supercharging pressure, here 120:2=60 may be considered to be characteristic for the supercharging system utilized.

Further, exceeding the limits of presently available commercial high-pressure turbochargers will require the step to multi-stage superchargers and exhaust gas turbines. These superchargers do not lend themselves to standardization and economic manufacture. They are difficult in adjustment to the particular operating conditions of each engine on the testbed and in the field. They have low part load efficiencies and above all, they are slow in following load changes on the engine on account of, on the one hand, their high moment of inertia, on the other hand of their low part load efficiency.

Even at full load the efficiencies of these superchargers are low and generally insufficient to supply an excess of the air manifold pressure over the exhaust back pressure of the engine granting satisfactory scavenging.

It is the purpose of the present invention to indicate a method of operating a high supercharged internal combustion engine with supercharger ratios of 3/1 and more, at ratios of 7 and less between maximum full load cylinder pressure and the corresponding indicated pressure and 40 and less between the maximum full load cylinder pressure and the corresponding absolute supercharging pressure in the intake manifold on the engine, being able to operate on charging air temperatures, in the intake manifold, of 60° C. and more, without the necessity of derating the engine due to such high temperatures.

In FIGURE 1 an engine 10 exhausts into the exhaust header 12. The hot gases drive a high pressure turbine 14 which in turn drives the high pressure compressor 16. The gases leaving turbine 14 enter into the low pressure turbine 18 which drives the low pressure compressor 20. An intercooler 22 is arranged between compressors 16 and 20 and the air leaving compressor 16 flows through an aftercooler 24. The air then enters the intake header 26 of the engine.

A simple arrangement of this kind has a number of advantages. Operating two or more independently running exhaust driven superchargers in series ensures low moment of intertia per unit, thus permitting a fast reaction to load changes. Further, at each engine load and speed, each supercharger set will run at its own rotating speed ensuring best individual and total efficiency over a wide load range. Additionally, total efficiency of compression may be increased by the use of intercoolers between stages.

Series operation of these turbochargers also permits the use of single stage exhaust gas turbines driving single stage compressors, or for instance two stage exhaust gas turbines driving single stage compressors. Such sets are commercially available. They are already standardized to a considerable extent and on test and in the field they can easily be adapted to the particular requirements of each individual engine.

Experience and calculations demonstrate that these conditions are not sufficient to produce a sufficient excess of pressure in the intake manifold over the pressure in the exhaust header to ensure safe scavenging over a wide load range. Good scavenging is essential to high load carrying capacity of the engine on account of the elimination of the combustion products from the engine cylinder. Thus, the fullest possible charge with fresh non-contaminated air is assured.

According to the present invention, the energy supplied to the exhaust gas turbines is therefore increased by modifications of the engine cycle so as to increase exhaust temperatures in the load ranges where increase gas turbine output is required.

FIGURE 2 illustrates ways by which the exhaust energy of a compression ignition engine may be influenced in the desired manner. Diagram U, in light lines, may be termed the "normal diagram," which would be obtained by simply applying an increased charging pressure to a non-supercharged engine. The cut-off pressure of this diagram is relatively low and consequently the exhaust energy to be supplied to the exhaust gas turbines will be low.

Theoretically, the exhaust energy can be increased by lowering the maximum pressure in the cylinder, down to the constant pressure cycle where compression pressure and maximum cycle pressure coincide, as shown on the broken line diagram V.

Practically, this is not possible, due to the thermodynamics of combustion and there will always be a notable pressure rise between compression pressure and cylinder maximum pressure. In fact, all engine manufacturers design their engines so as to have minimum maximum pressures compatible with their compression pressures, in order to maintain least mechanical load of an engine. Pressure differentials between compression and maximum cylinder pressures may range from as low as 15 kg./cm.$^2$ in slow speed engines to 40 kg./cm.$^2$ and more in fast running supercharged engines.

According to the invention, mechanical means are provided to effect the exhaust energy. For instance, as shown on the full line diagram W, the compression ratio can be reduced so as to leave a sufficient pressure differential for combustion.

There are a number of different ways to increase the exhaust energy of the engine to produce the desired results and supply exhaust gases to the turbines of the highest possible temperature over the widest possible load range, some of which will be referred to and explained more or less in detail hereinafter and others of which will merely be referred to in general. For example, one such mechanism for a four cycle diesel or dual fuel pilot injection engine is shown in U.S. Patent No. 2,670,595, issued March 2, 1954. For a two cycle diesel or dual fuel engine, a similar mechanism and approach is shown in U.S. Patent No. 2,952,968, issued September 20, 1960, and U.S. Patent No. 2,991,616, issued July 11, 1961. Another approach for a spark-fired, gas fuel engine, be it two cycle or four cycle, is shown in U.S. Patent No. 2,773,490, issued December 11, 1956, and also in U.S. Patent No. 2,936,575, issued May 17, 1960. Another mechanism for either two or four cycle engines of the diesel, dual fuel or gas spark-fired type is shown in U.S. Patent No. 2,989,840, issued June 27, 1961. Another way of influencing the cycle efficiency but involving a mildly complex piston structure is shown in U.S. Patent No. 2,742,027, issued April 17, 1956, and U.S. Patent No. 2,910,826, issued November 3, 1959. Various of these will be referred to more or less in detail hereinafter.

Alterations of the exhaust energy available can advantageously be conducted so as to coincide with a reduction of the maximum pressures in the cylinder. An engine according to the invention can thus be designed lighter than the conventional high supercharged engine operating at the same high supercharging pressure in the intake manifold of the engine.

FIGURE 3 enters into more details with regard to the energy supplied to the exhaust gas turbines. The exhaust ports open at point A and the gases expand down to the final exhaust back pressure, close to the atmospheric pressure, point B. The supercharging pressure level is marked by X, that of the back pressure in the exhaust gas manifold of the engine by Y, slightly lower than X in order to permit scavenging, with atmospheric at Z. The area ABE represents the energy available to the exhaust gas turbines. Out of this, the area DCBE alone can be converted into mechanical energy in constant pressure turbines; the triangle ACB representing the kinetic energy of the gases exhausting from the engine cylinder into the exhaust header.

In order to make best use of the increased exhaust energy supplied by raising the pressure and temperature at point A, it is, therefore, necessary to convert a maximum of the kinetic energy of the exhaust gases into mechanical turbine output. It is desirable, therefore, to use, as high pressure turbines, turbines designed for the use of the exhaust pulses, or exhaust pulse converters in the exhaust line in order to convert the kinetic energy of the gases into pressure.

The low pressure turbine will operate as a constant pressure turbine, and consequently at best efficiency at all loads, whereas the high pressure turbine will be a compromise between a pure pulse turbine and a pure constant pressure turbine and will be less favorable in efficiency at low loads where the pulse effect is correspondingly reduced.

The compression ratios of the compressors driven by the exhaust gas turbines and the expansion ratios of these turbines will be determined by the most advantageous load division taking into account the individual efficiencies of the turbine and compressor stages.

Many different connections of these superchargers among themselves and the engines are possible. For instance, in a system consisting of two supercharging sets in series, the following solutions may be particularly favorable in specific applications:

The low pressure compressor may be driven by the high pressure turbine and vice versa, the high pressure compressor by the low pressure turbine.

Such a system will permit quickest reaction to load changes, as the high pressure turbine will first sense the effect of any load increase of the engine. By acting directly on the low pressure compressor, in other words on the air intake, the whole compressor system will follow so much faster.

The design of the high pressure turbine essentially as a pulse turbine will permit, for the first time, to dimension the high pressure turbine so as to operate without reflection of pressure and velocity waves at the gas turbine nozzles. Indeed, it can be demonstrated that a positive reflection wave can be suppressed in a line with a mean flow velocity of $c$ of a fluid having a velocity of sound $a$ by dimensioning the orifice at the end of this line so that the velocity of the fluid in this orifice is less than $$v = \sqrt{a.c}$$

By selecting the orifice of the turbine so as to obtain a mean velocity equal to or less than that calculated according to this formula, there is either no reflection at the orifice or the reflection of a negative pressure wave. All unfavorable effects of exhaust waves on the engine cylinders can thus be eliminated.

The free selection of the dimensions of the orifice of the high pressure exhaust gas turbine has been made possible by the fact that the intermediate pressure, between the outlet of the high pressure turbine and the intake of the low pressure turbine, can be selected between wide limits. This will then determine the pressure level between the low pressure and the high pressure compressor on the air intake side. The pulse and acoustic energy of the gases leaving the engine cylinders will be so much absorbed by conversion into mechanical energy and by turbulence, during the passage of the gases through two or more exhaust gas turbines that, except in quite particular cases, no exhaust silencers will be required anymore.

In certain cases, several high pressure turbines may exhaust into one single low pressure turbine. For instance, in V-type engines, each bank may be equipped with a high pressure turbine and the exhaust of both may be combined in one single low pressure turbine. This may again permit to make best use of the exhaust pulse energy.

Figure 13:
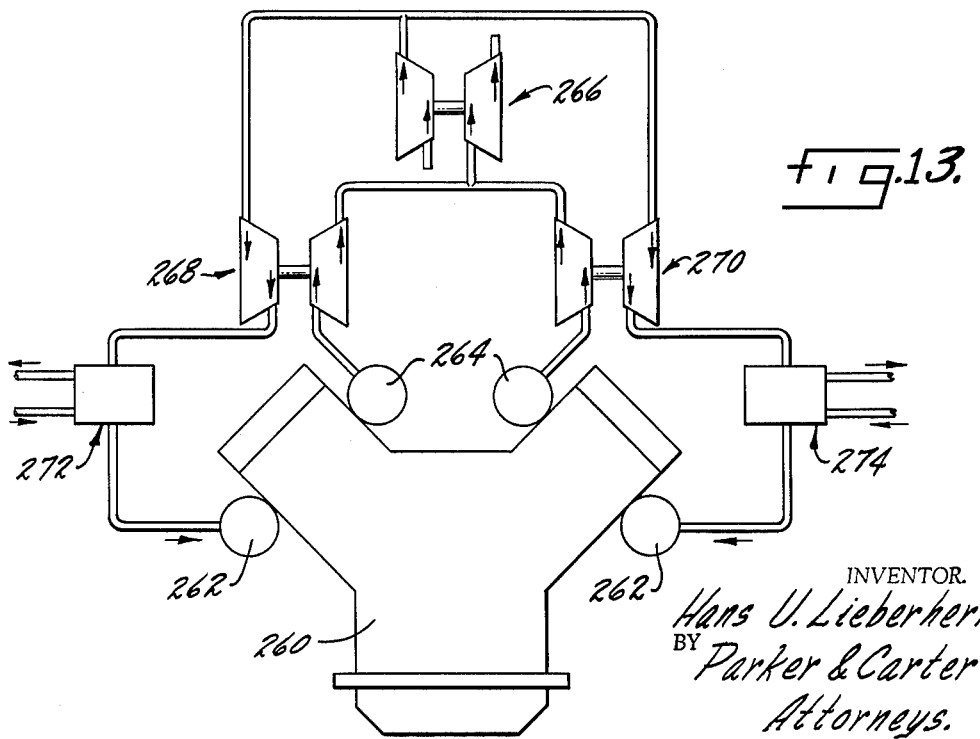
FIGURE 13 is a schematic of still a further variation.

In FIGURE 13, such an arrangement is shown in which the engine 260 is of the V-type having inlet manifolds 262 on each side and exhaust manifolds 264 between the cylinder banks. A low pressure turbocharger 266 supplies air to the compressors of high pressure turbochargers 268 and 270 on a divided basis. Thereafter, the air goes to aftercoolers 272, 274 and then to the inlet manifolds. The exhaust gases from exhaust manifolds 264 go to the turbines, respectively, of the high pressure turbochargers and after leaving the high pressure turbochargers, they join to go to the turbine of the low pressure turbocharger 266. Intercoolers might be used between the low pressure compressors and the high pressure compressors, although this is not essential.

The reverse arrangement might be used, one high pressure unit and two low pressure turbochargers.

In FIGURE 10, for example, the engine 170 has a high pressure turbocharger 172 and two low pressure turbochargers 174 and 176. The high pressure turbocharger 172 has a high pressure compressor 178 which receives air from an intercooler 180 and supplies it to an aftercooler 182, then to the engine. The exhaust gases come from the exhaust manifold to the high pressure turbine 184 and then to the low pressure turbochargers. The exhaust gases from the high pressure turbine 184 are divided through passages 186 and 188 with the low pressure turbine 190 of the turbocharger 174 always receiving exhaust gases to drive its low pressure compressor 192.

The low pressure turbine 194 of turbocharger 176 would on occasion receive exhaust gases through line 186 depending on the position of valve 196 as controlled through a linkage 198 by the governor 200. Thus, when the valve 196 is open, as shown diagrammatically in FIGURE 10, turbocharger 176 would receive exhaust gases and the low pressure compressor 202 would supply air to the engine. I position a check valve or non-return valve 204 on the high pressure side of the low pressure compressor 202 such that when turbocharger 176 is cut out and is not operating, the compressed air from turbine 192 will not be able to escape through the idle compressor 202 but must go to the engine.

This unit, in effect, has one high pressure turbocharger and two low pressure turbochargers, not necessarily of the same size. The governor control of valve 196 would be such that the second low pressure turbocharger 176 might be cut out at low loads and speeds with the valve 196 closed. But at the higher loads and higher speeds, the valve 196 might be open so that both low pressure turbochargers would be supplying compressed air to the high pressure unit.

In FIGURE 11, for example, the engine 206 is differently equipped. The low pressure turbine 208 is supplied with inlet and exhaust valves 210 and 212, respectively, which can be operated, through a control 215, by a barometric capsule 214 so that the low pressure turbocharger can be cut out or can be placed on the line, as the case may be. A high pressure turbocharger 216 is always in operation as is an aftercooler 218. The intercooler 220 may be used with turbocharger 208 on the line. The arrangement is such that for high altitude use, the capsule would position the valves in the position shown in FIGURE 11 so that the turbocharger 208 would operate. Thus, in effect, the turbocharger 208 would bring the unit back down to sea level, which is to say that the turbocharger 216 would receive air from the low pressure turbocharger 208 about at atmospheric pressure. When the unit was taken back down to or close to sea level again, for example, the barometric capsule would operate the valves to cut out the low pressure turbocharger.

In all of the arrangements shown and described, it will be realized that I provide two free running turbochargers, each of which is not physically connected to be driven by the engine crankshaft but in reality runs freely and is driven purely and solely by exhaust gases. The invention is applicable to two cycle or four cycle engines, diesel, dual fuel or gas engines. In any event, I then, by suitable manipulation, increase the exhaust energy of the engine itself from what it otherwise would be so that the temperature of the exhaust gases will be higher thereby providing more energy to drive the free running turbochargers. I thus maintain a sufficiently high inlet manifold pressure over the maximum portion of the load range so that the pressure differential across the cylinder will provide good scavenging. Many different methods are individually known for increasing the exhaust energy, and I have referred to and shown a few of them. I prefer to use an arrangement which involves variable valve timing, for example, closing the inlet valve early during the suction stroke of the piston or late during the compression stroke so that I, in effect, reduce the effective compression ratio by a mechanism such as shown in U.S. Patent No. 2,670,595, issued March 2, 1954. But any one of the other procedures set forth hereinabove may be used. The point is that the exhaust energy available from the engine itself is increased and in turn assists the turbochargers to maintain a sufficiently high inlet manifold pressure over a greater portion of the load range, resulting in effective scavenging.

The application of this supercharging system will necessarily vary according to whether it applies to a compression-ignition engine or to a spark-fired engine.

In compreshion-ignition engines, the division between the compresson ratio in the engine, in the case of engines with variable compression ratios in order to influence the amount of exhaust energy, and the compression ratio of the superchargers, as well as the control of the charging air temperature are so conducted that safe ignition will take place at all loads and speeds and particularly that the highest possible compression end temperature and compression end pressure will be maintained at part loads.

Safe ignition is a prerequisite to a compression-ignition engine. Maintaining highest possible cylinder pressures and temperatures even under part load insures highest thermal efficiency and consequently lowest fuel consumption at part loads. Best scavenging must be achived at full load in order to reduce the temperature in the cylinder. At part load the thermal loads of the cylinder will be lower anyhow so that loss of scavenging will be of secondary importance.

The means for increasing exhaust energy at the expense of cycle efficiency will consequently intervene at full load and near full load.

FIGURE 4 shows a numerical example of such a cycle, as far as the compression part is concerned.

Above the abscissa, the pressures of the charging air are represented; below the abscissa, its temperatures, both plotted against volume.

The example is based on the comparison to a conventional engine charged with air of 30° C. at 2.3 kg./cm.$^2$ abs. and which at the end of the compression stroke attains a pressure of 70 kg./cm.$^2$ abs. and a temperature of 587° C. It is assumed that the same temperature and pressure are required for safe ignition in the engine according to the invention and that consequently the characteristic point 8 of the beginning of compression 6 must lie on the same compression curve 8–7 as in the conventional engine. Whereas in the conventional engine, in order to obtain an air temperature of 30° C., a coolant temperature of at least 20–25° C. is necessary, it is assumed that in this engine cooling means of 75° C. for instance are only available so that cooling of the air will be limited to 85° C.

Compression in the compressor of the low pressure turbocharger, such as at 20 in FIGURE 1, begins at 100% volume and atmospheric pressure, here assumed to be 1 kg./cm.$^2$, and ambient temperature, assumed 20° C. as shown at point 1 in FIGURE 4. A compression rate of 2.3 brings this air to 115° C., taking into account an adiabatic efficiency of the blower of 80%, as at point 2. In an intercooler, such as at 22 in FIGURE 1, this air is cooled at 85° C., at point 3 and conducted to the intake of the high pressure compressor, of 1.72 pressure ratio, as at 16 in FIGURE 1. Compression, again with 80% efficiency, leads to point 4, at 4 kg./cm.$^2$ abs. and 146° C. Cooled down to 85° C., in intercooler 24 in FIGURE 1, to point 5, the air now occupies 30.6% of the original volume at 4 kg./cm.$^2$ abs. At the entrance in the cylinder, the air is heated by the valves and the cylinder walls by an estimated 50° C., back to point 6, so that compression in the cylinder begins at 34.9% of the original volume at 4 kg./cm.$^2$ abs. and 135° C. The end compression volume at point 7 is 4.2%, so that the effective volumetric compression ratio in the cylinder is 34.9/4.2=8.3/1.

Thus, it has been possible, even with cooling the air to 85° C. only, to obtain the same air weight in the cylinder, at the same compression pressure and temperature as in the conventional engine where the air was cooled down as low as 30° C. At the same coolant temperature, of 75° C. at the aftercooler inlet, would have required a derating of 25 to 30% of the useful output of the conventional engine.

The volumetric compression ratio at full load of 8.3/1, according to the example given above, although fully sufficient at full load for safe ignition, would certainly not permit safe starting from cold, for instance. It is necessary, therefore, to provide means for improving ignition conditions at low loads, either by increase of the compression ratio or by preheating of the air charge. Preheating can be effected down to certain part loads by partial or total suppression of after-cooling.

In spark-ignition engines, the condition prevails that the compression end temperature and, to a certain extent, the compression end pressure, must be such as to preclude detonation of the combustible mixture.

In the present invention, the division between the compression ratio in the cylinder and that in the superchargers as well as the air temperature after the aftercooler must, therefore, be so controlled that detonation will be avoided at all loads.

Exhaust temperatures in gas burning engines are considerably higher than in compression ignition engines, due to the fact that the operation takes place much closer to the stochiometric mixture between air and fuel, and even in the case of a high supercharged engine of the present kind, sufficient exhaust energy will be available.

At low engine loads, however, there is some danger of insufficient energy being put at the disposal of the exhaust gas turbines, so that scavenging will be incomplete, the cylinder will remain partially filled with hot residues and detonation of the new charge may thus be initiated. In this case, it is necessary to increase the exhaust energy at low loads. This can be done by a change in the intake volume of the cylinder, by variation of the valve timing, or to a much less controlled extent, by variation of the air-fuel ratio, resulting in sluggish combustion.

FIGURE 5 is similar to FIGURE 4 but illustrates the compression phase at full load of such a high supercharged spark-fired engine. According to the nature of the gas fuel used, the permissible compression ratio may vary, but it will be assumed that in an engine operating at an intake pressure of 3 kg./cm.$^2$ abs. and an intake air temperature of 35° C. (plus 50° C. heating effect), together with an 8/1 volumetric compression ratio, no detonation would occur. Assuming polytropic compression with an exponent of 1.35, the compression end temperature will thus be 470° C.

In the latter engine, compression begins at ambient pressure of 1 kg./cm.$^2$ abs. and 20° C. at point 1. Compression the low pressure turbocharger of a 3/1 pressure ratio leads to point 2, at 3 kg./cm.$^2$ abs. and 156° C., calculated with an adiabatic efficiency of 80%. The air leaving the low pressure compressor is cooled down to 60° C., point 3, and is then compressed to a final 6 kg./cm.$^2$ abs. in the high pressure compressor, having a pressure ratio of 2/1, point 4. Cooled to 70° C., point 5, it enters the intake header of the engine and entering the cylinder is heated by 50° C., having now the 120° C. corresponding to 6 kg./cm.$^2$ abs. on the original compression curve, as at point 6.

As in the previous example, the engine according to the invention, operating with the same weight of air at the same temperatures and pressures in the compression phase, will supply the same output as the conventional engine, although the air is cooled down to 60 and 70° C., respectively, in opposition to 35° C. required by the conventional engine.

Reciprocatively, operating at the same low air temperature of 35° C., the engine according to the invention would permit a considerably higher output without exceeding safe limits towards detonation. Supercharging in several compressor stages, as shown in FIGURES 4 and 5, may make use of intercoolers and will always require aftercoolers. The role of the intercoolers is limited. They essentially permit to reduce the compression work required by the subsequent stages and they will thus improve overall compression efficiency. Intercooling will be used to full extent particularly where low temperature cooling fluid is available in sufficient quantity, as for instance in marine plants.

Aftercoolers, on the contrary, are essential elements. They serve to control the air temperature in the intake header of the engine. In a compression-ignition engine, a sufficiently high temperature must be held to insure safe ignition of the fuel. In a spark-fired engine, the gas-air mixture is not allowed to detonate at the end of the compression stroke and the aftercooler serves to keep the air intake temperature sufficiently low.

The examples of FIGURES 4 and 5 have illustrated the very important point that in engines according to the invention, the air intake temperatures are in the same range as the temperature of the jacket cooling water of the engine. If cooling fluids at low temperatures are available in sufficient amounts, such a solution leads to high temperature differentials between the air and the cooling fluid and consequently to small heat exchanger surfaces and small, inexpensive heat exchangers. With normal aftercooler dimensions, such high air temperatures permit the use of cooling fluids of relatively high temperatures. Thus, it becomes possible to use the same cooling water circuit for the aftercooler as for the jacket cooling water. For instance, on a locomotive engine, with ambient air temperatures of 40° C., it is easy to obtain, in radiator heat exchangers, a cooling water temperature of 60° C., amply sufficient for the aftercooler of a high supercharged engine of this type. This high temperature differential may even permit the use of air-air heat exchangers between the supercharging air and the ambient air.

It has been shown earlier in this description that on compression-ignition engines efficient part load operation can be obtained by maintaining the part load air intake temperature as close as possible to the full load temperature. In principle, this could be done by by-passing partially the cooling fluid to the aftercooler at part load. This solution is simple, but slow in its effects, due to the thermal inertia of the aftercooler. In the present solution, it is considered more interesting to bypass the supercharger air. The bypass can be so controlled by the air temperature in the intake header that at low temperatures the bypass remains completely open until the temperature of the air ahead of the aftercooler reaches the desired normal temperature. From this point on, the bypass closes with further increasing load and is fully closed at full load and overload of the engine. This is shown more or less in FIGURE 7 and will be explained in detail hereinafter.

Figure 7:
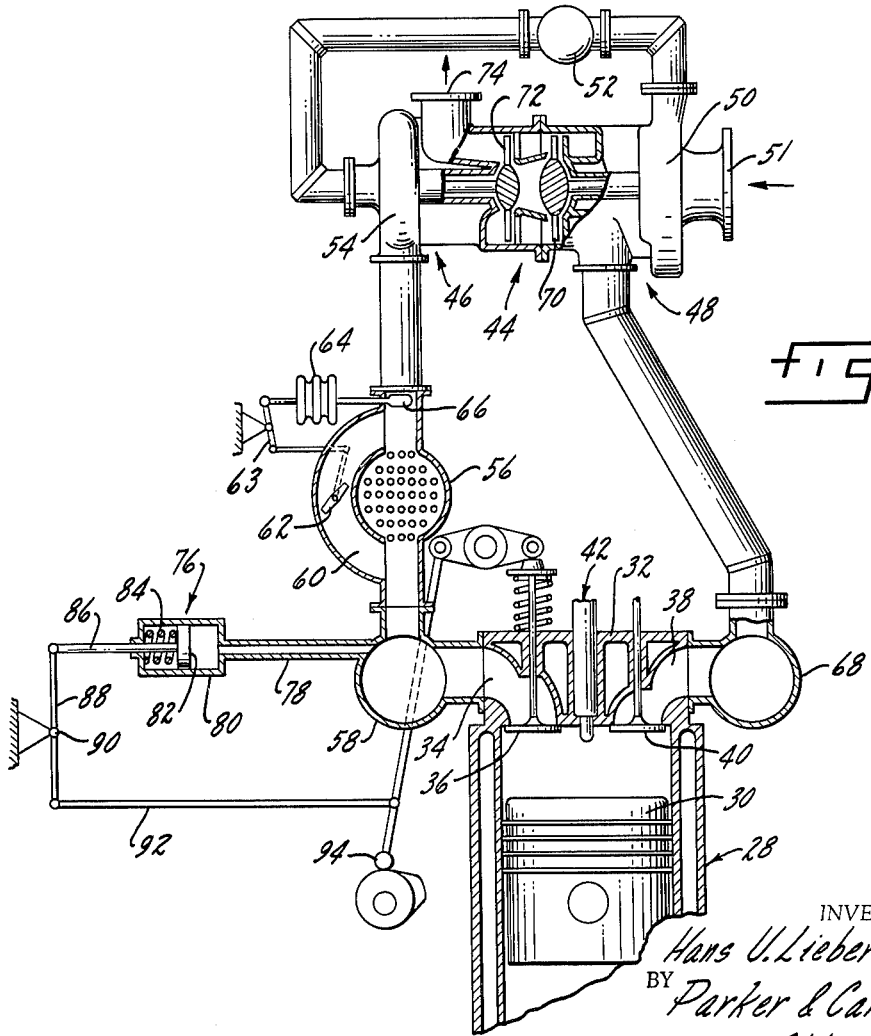
FIGURE 7 is a diagrammatic view, partly in section, of a four cycle compression ignition engine constructed to operate according to my invention.

In FIGURE 7, I show a four cycle compression-ignition engine with the cylinder indicated generally at 28 and the usual piston at 30 and cylinder head at 32. The cylinder head has the usual inlet port 34, inlet valve 36, exhaust port 38, and exhaust valve 40. A suitable diesel injection device is indicated generally at 42. The valves may be closed by suitable springs and opened by rocker arms, push rods and appropriate cams or by hydraulic means in the usual manner, except as set forth hereinbelow.

The exhaust driven superchargers, indicated generally at 44, include two free running units, indicated generally at 46 and 48. The compressor 50 of the turbocharger 48, which may be considered to be the low pressure compressor, supplies air from an inlet 51 to an intercooler 52, which in turn supplies the compressed cooled air to a second compressor 54, the second or high stage of compression, which in turn supplies it to an aftercooler 56 and from there to the inlet manifold 58. The aftercooler is provided with a bypass 60 controlled by a valve 62 which, through a suitable linkage 63, is operated by a bellows 64 controlled by a temperature sensitive bulb 66 positioned between the second stage compressor 54 and the after cooler 56. The exhaust gases from the engine go to an exhaust header 68, then through a suitable conduit to a high pressure turbine 70, which drives the first stage compressor 50. The exhaust gases then go to a second stage or low pressure turbine 72 which drives the high stage compressor 54, then to a suitable outlet 74. The operation of the valve in the bypass 60 may be such that the thermostatic bulb would keep the bypass open at the low outlet temperatures coming from the second stage compressor 54 and would close it completely from a predetermined temperature on so that at the lower loads the air temperature to the engine will be higher than it otherwise would. The coolers 52 and 56 could be supplied with any suitable cooling medium, such as water or otherwise.

The inlet valve 36 is shown as controlled by an actuator mechanism 76 which includes a suitable pipe or conduit 78 connected to the inlet manifold so that pressure variations of the inlet air will be reflected in a cylinder 80 to bias a suitable piston 82 against a spring 84, the cylinder behind the piston being vented to prevent resistance to piston movement other than by the spring. The piston rod 86 is connected to a suitable lever 88, pivoted at 90 and connected by a link 92 to control the position of the follower roller 94 on the pushrod that controls the operation of the inlet valve 36.

Thus, the opening and closing time of the inlet valve will be varied in accordance with the inlet manifold pressure which, since the air is supplied to the inlet manifold by exhaust driven superchargers, varies in accordance with load. Thus, the engine will have a variable compression ratio according to the intake air header pressure, the effective compression ratio decreasing with increasing load, and vice versa. Thus, at the higher loads the exhaust energy available to the supercharging sets will be increased so that the exhaust gases will be at a higher temperature than otherwise, resulting in excellent scavenging, as set forth hereinabove. It will also be noticed that the gas turbines are closely coupled, with the high pressure turbine 70 exhausting directly into the inlet of the low pressure turbine 72. Also, the high pressure turbine 70 drives the low pressure compressor 50 with the low pressure turbine 72 driving the high pressure compressor 54, but it might be reversed.

Figure 8:
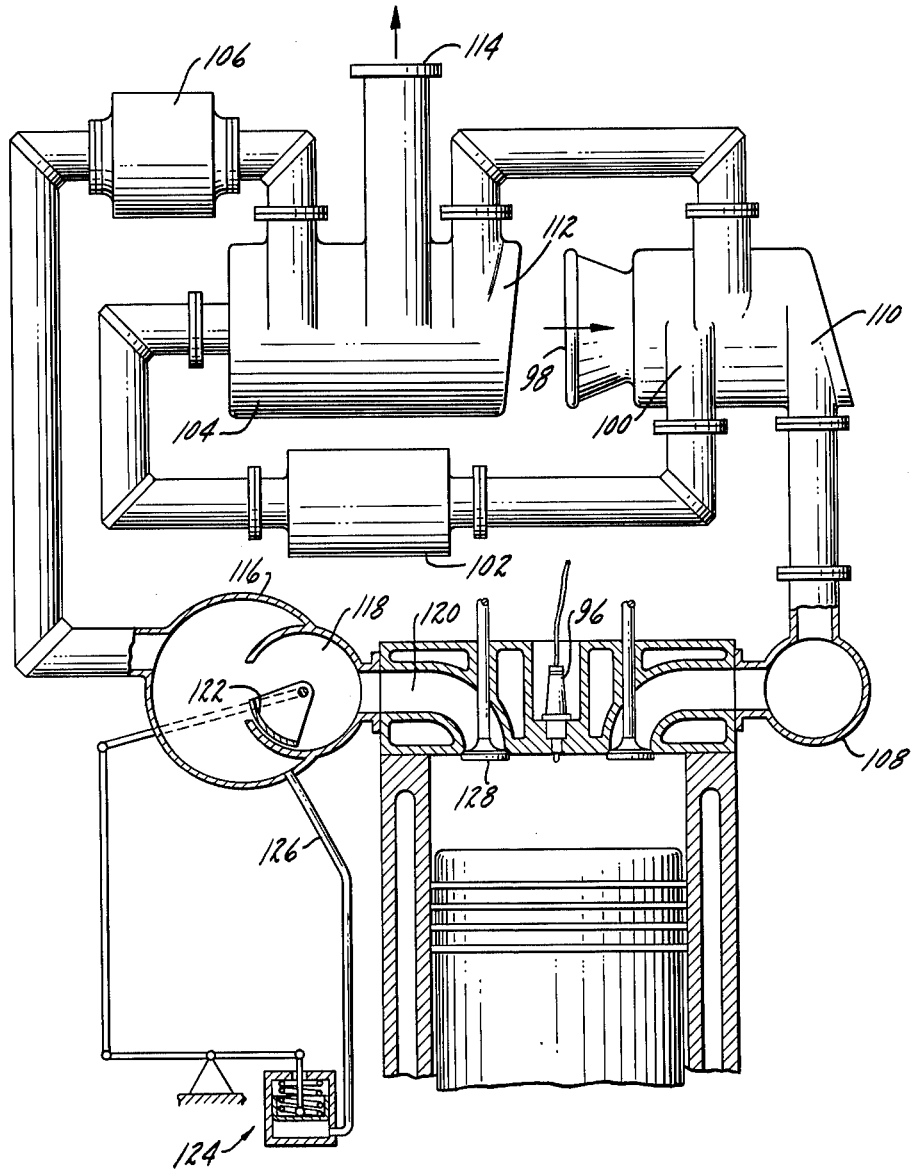
FIGURE 8 is similar to FIGURE 7 but showing a four cycle, gas fuel, spark-fired engine constructed to operate according to my invention.

In FIGURE 8, the arrangement is generally the same except that instead of having a diesel injector, the engine is supplied with gaseous fuel through a suitable valve, not shown, and uses a sparkplug 96 or any suitable ignition device. As in FIGURE 7, the engine is a four cycle engine with exhaust and inlet valves. Tracing the air system, the air is drawn in through an inlet 98 to the low pressure compressor 100, then supplied to an intercooler 102. The air then goes to the second stage or high pressure compressor 104 and then to the aftercooler 106, then to the engine. The exhaust gases go from the exhaust manifold 108 to the high pressure turbine 110 which drives the low stage compressor 100, then to the low pressure turbine 112, which drives the high stage compressor 104, then to the exhaust 114.

Such as shown in U.S. Patent 2,989,840, issued June 27, 1961, the engine may have a general inlet header 116 and an individual air receiver 118 connected to the inlet passage 120 of a cylinder and separated from the general header by a control valve 122 which is controlled by an actuating mechanism 124, similar to the one shown in FIGURE 7, and responsive to the pressure of the air in the general header by a pipe or conduit 126 arranged so that at the higher loads, the control valve 122 will be open and will begin to close or throttle down at the lower loads. At full load, for example, the valve 122 might be fully open with the inlet valve 128 in the cylinder closing early to control the amount of compression, but with fixed timing. As the load drops, the throttle valve 122 might close so that the expansion of the mixture in the cylinder will include the volume between the throttle valve 122 and the inlet valve as well as the cylinder volume up until the time the inlet valve closes. It should also be understood that the arrangement of FIGURE 8 can also be operated on the diesel or dual fuel cycle, but the operation of the mechanism 124 for controlling the throttle valve 122 would be reversed. In any event, this system insures scavenging by the expansion of the air contained in the volume between the throttle and the intake valve.

The arrangement shown in FIGURE 9 bears some resemblance to the general system shown in prior Patent 2,952,968, issued September 20, 1960, and specifically refers to a two cycle compression-ignition engine in which the cylinder 129 has suitable exhaust ports 130 and inlet ports 132 in the wall thereof for supplying fresh air and for exhausting the burnt products of combustion.

Tracing the air circuit, fresh air is drawn in through an inlet 134 to the low pressure compressor 136 which supplies the air to an intercooler 138, then to the high pressure compressor 140. The air then goes to a crankshaft driven compressor 142, then to an aftercooler 144 before going to the inlet manifold 146. The exhaust gases go from the exhaust header 148 to a high pressure turbine 150 which drives the high pressure compressor 140, then to a low pressure turbine 152 which drives the low pressure compressor 136, then to an outlet 154. It will be noted that this is the reverse of the previous illustration since the high pressure exhaust turbine drives the high pressure compressor and vice versa. A feedback passage 156 is provided in the cylinder wall controlled by a valve 158 which in turn is controlled by a linkage 160. A portion of the linkage is eccentrically operated as at 162, suitably driven from the drive shaft, so that the valve 158 opens and closes in timed relationship to the cyclic operation of the engine. But the timing may be changed by a control and actuating mechanism 164 which is similar to the actuating mechanism shown FIGURES 7 and 8 except that the pressure of the exhaust is fed through a suitable line 166 to the other side of the piston, opposite the inlet manifold pressure, which is fed through line 168. This in effect provides a variable feedback through passage 156 from the cylinder to the scavenging air manifold for reduction of the compression ratio and consequently, at a given load increase of the exhaust energy available, according to the pressure differential existing between the intake and exhaust manifolds. In the position shown, the timing of the valve is at full load. The controlling of the feedback valve 158, which is effect will control to a certain extent the cycle efficiency of the engine, would also control the volumetric scavenging air compression necessary at starting and up to certain part loads, thus effectively increasing the exhaust energy required by the necessity to supply to the volumetric compressor 142 the air volume required for satisfactory scavenging.

Further, due to the ability of the engine to operate on high cooling fluid temperature at the aftercooler, without any loss in load carrying capacity, the jacket cooling water may be used with a coresponding considerable simplification in piping. Keeping the temperature of the jacket water constant at all loads, for instance by means of thermostatic valves, will lead to cooling the intake air at high engine loads and heating it at low loads, exactly as desired for compression-ignition engines. As heating of the air automatically corrects ignition conditions, so much less compression ratio is required in the engine and so much more effectively, the maximum cycle pressures can be controlled.

In this case remains the problem of starting the engine. Preheating prior to starting or preheating the air during starting allow operation with similar low compression ratios as found desirable for full load conditions. FIGURE 6 shows the relationship between intake temperature and the necessary compression ratios in order to achieve the same ignition delay and consequently the same ignition conditions. Assuming that we wish to obtain, with preheated air of 70° C., the same ignition delay as on a conventional engine with a volumetric compression ratio of 12:1 and starting from an intake temperature of 20° C., it is sufficient to lay out the engine for a compression ratio of 9.5/1. Starting out from 4 kg./cm.$^2$ abs. supercharging pressure at full load, the compression end pressure would then be 83 kg./cm.$^2$ abs., well within tht limits of the mechanical resistance of a high supercharged engine according to the invention.

Figure 12:
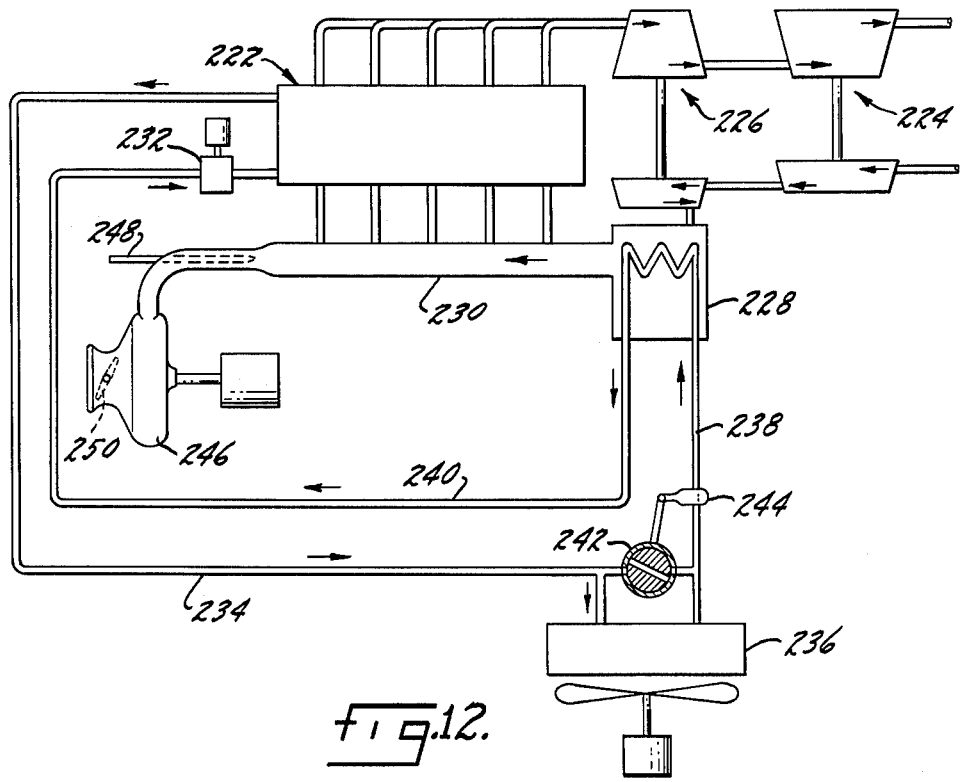
FIGURE 12 is a schematic of a further variation.

In FIGURE 12, the engine is indicated at 222, the low stage turbocharger at 224, the high stage unit at 226, the aftercooler at 228, and the inlet manifold at 230. The cooling fluid flows through the engine jackets from a suitable pump 232 and is connected by a line 234 to a suitable radiator 236 where it is air cooled. By a line 238, the cooling fluid passes through the aftercooler and then returns to the pump by a suitable connection 240. The radiator may have a bypass connection 242 which may be thermostatically controlled by a bulb 244 or the like so that a high jacket water temperature may be maintained totally independently of load and ambient temperatures.

In starting, an air heater consisting of a blower 246 and a burner 248 is used to preheat the air and supply it under pressure to the engine, the mixture being such that the engine is supplied with hot combustion gases which contain a sufficiently high oxygen content to support additional combustion and sufficient for starting. As soon as the engine is operating normally, the burner is shut off and the air intake to the burner is closed in any suitable manner, such as by a valve 250. The result is that the air is preheated during starting, and then during running a single cooling water circuit is used for both the engine jackets and the aftercooler and may have suitable arrangements for maintaining a high jacket water temperature. While I have stated that the heater burner may be used during starting, it may also be used during low loads.

While I have shown and described the preferred form of my invention and suggested various modifications and shown several embodiments, it should be understood that suitable additional modifications, changes, substitutions and alterations may be made without departing from the invention's fundamental theme.

1. An internal combustion engine having at least two exhaust gas driven turbochargers each having a turbine connected to receive exhaust gas from the engine to be driven thereby and a compressor connected to compress and supply the inlet air to the engine, each of the turbochargers being free-running and connected in series so that one of the compressors operates at relatively low pressures and the other at relatively high pressures and one of the turbines operates at relatively low pressures and the other at relatively high pressures, the turbochargers being constructed to supply air to the engine at an absolute pressure of at least three atmospheres, relative to ambient air pressure, at full load on the engine, an aftercooler connected between the high pressure compressor and the engine for cooling the air before it is supplied to the engine, and means for adjusting the engine itself over at least a substantial portion of the load range on the engine while at least one of the turbochargers is operating so that the exhaust gases supplied to the turbines will be at a higher temperature than otherwise to sustain the turbochargers and provide better scavenging over a greater portion of the load range.

2. The structure of claim 1 further characterized in that the engine is a compression-ignition engine and including means for bypassing air around the aftercooler and supplying it to the engine responsive to the temperature of the air from the high pressure compressor and arranged so that the temperature of the air received by the engine will be higher than it otherwise would be at the lower loads.

3. The structure of claim 1 further characterized in that the engine is a compression-ignition engine, and includes means for varying the effective compression ratio in the engine responsive to load constructed to reduce the compression ratio of the engine at the higher loads.

4. The structure of claim 3 further characterized in that said last mentioned means is responsive to the pressure differential between the engine intake and exhaust pressures.

5. The structure of claim 1 further characterized in that the engine is a gas fuel spark-fired engine, and includes means for varying the effective compression ratio in the engine responsive to the pressure differential between the engine intake and exhaust pressures and constructed to reduce the compression ratio of the engine at the lower loads.

6. The structure of claim 1 further characterized by and including at least two high pressure turbochargers connected in parallel with the turbine of each connected to a separate group of engine cylinders, the turbines of all of the high pressure turbochargers exhausting into the turbine of a common low pressure turbocharger.

7. The structure of claim 1 further characterized by and including at least two low pressure turbochargers connected in parallel with each other and each being connected in series with the high pressure turbocharger.

8. The structure of claim 7 further characterized by and including a valve arrangement for controlling the supply of exhaust gases to one of the low pressure turbochargers, and means for operating the valve arrangement responsive to load on the engine so that the said one low pressure turbocharger will receive exhaust gases during only a portion of the load range.

9. The structure of claim 1 further characterized by and including means for controlling the temperature of the air in the intake header, and means for varying the effective compression ratio, the ratio varying means and the temperature controlling means being coordinated so that the exhaust gases supplied by the engine will be coordinated to obtain the highest permissible temperature over the widest part of the load range.

10. The structure of claim 1 further characterized by and including a cooling medium system for the aftercooler, the system including the cooling jackets for the engine.

11. The structure of claim 10 further characterized by and including a heater arrangement for heating the air to the engine, constructed and arranged to heat the air during starting and at low loads.

12. The structure of claim 10 further characterized by and including a radiator in the system constructed and arranged to supply an approximately constant temperature cooling medium to the aftercooler independently of load and ambient temperature.

13. The structure of claim 1 further characterized in that the high pressure turbine has an inlet orifice dimensioned such that the exhaust gas pulses received from the engine are not reflected as positive pressure waves over a substantial portion of the load range.

14. The structure of claim 13 further characterized in that the inlet orifice of the high pressure turbine of the engine is such that positive pressure waves are not reflected only during the higher portion of the load range of the engine.

15. The structure of claim 1 further characterized in that the high pressure turbine is essentially an impulse unit and the low pressure turbine is essentially a constant pressure unit, the inlet orifice to the high pressure impulse unit being dimensioned so that the mean velocity is no greater than that according to the formula $v=\sqrt{a.c}$ where $a$ equals the velocity of sound and $c$ equals the mean flow velocity.

16. A method of operating an internal combustion engine including the steps of precompressing the inlet air in two independent stages before it is supplied to the engine to elevate its temperature and pressure and reducing the temperature of the air by cooling it at least after the second stage of compression, using the energy from the exhaust gas of the engine to perform both stages of compression in series by using the exhaust gas to perform first one stage of compression and then the other, and at the same time adjusting the operating cycle of the engine itself to increase the temperature of the exhaust gases coming from the engine to provide the necessary amount of energy for the two compressing stages.

17. The method of claim 16 further characterized in that the step of adjusting the operating cycle includes varying the valve timing to reduce the effective compression ratio during a certain portion of the load range while the precompressing step is taking place.

18. The method of claim 16 further characterized in that the step of cooling the air after the second stage of compression includes cooling only a portion of the air and allowing the remaining portion to go directly to the engine during a certain portion of the load range.

19. The method of claim 16 further characterized in that the step of adjusting the operating cycle of the engine itself includes varying the valve timing of the engine to vary the effective compression ratio over a certain portion of the load range while the two compressing stages are taking place, and controlling the variation of the valve timing in accordance with a certain relationship between engine inlet and exhaust pressures.

20. The method of claim 16 further characterized by and including using only the higher stage of compression by eliminating the lower stage during only a portion of the load range on the engine.

References Cited by the Examiner
UNITED STATES PATENTS

| | | | |
|---|---|---|---|
| 1,787,717 | 1/1931 | Boulet | 123—90 |
| 2,306,277 | 12/1942 | Oswald | 60—13 |
| 2,387,560 | 10/1945 | Boulet | 60—13 |
| 2,625,006 | 1/1953 | Lundquist | 60—13 |
| 2,670,595 | 3/1954 | Miller | 60—13 |
| 2,710,521 | 6/1955 | Nettel | 60—13 |
| 2,773,490 | 12/1956 | Miller. | |
| 2,780,912 | 2/1957 | Miller | 60—13 |
| 2,910,826 | 11/1959 | Mansfield | 60—13 |
| 2,936,575 | 5/1960 | Lieberherr | 60—13 |
| 2,952,968 | 9/1960 | Lieberherr | 60—13 |
| 2,989,840 | 6/1961 | Lieberherr | 60—13 |
| 2,991,616 | 7/1961 | Miller | 60—13 |
| 3,144,749 | 8/1964 | Miller | 60—13 |

References Cited by the Applicant
UNITED STATES PATENTS

| | | |
|---|---|---|
| 1,612,053 | 12/1926 | Restany. |
| 2,292,233 | 8/1942 | Lysholm. |
| 2,373,139 | 4/1945 | Morris. |
| 2,807,245 | 9/1957 | Unger. |
| 2,858,666 | 11/1958 | Fullemann. |
| 2,874,534 | 2/1959 | Canazzi. |
| 3,001,692 | 9/1961 | Schierl. |

OTHER REFERENCES

Ser. No. 304, 834 (A.P.C.), published April 27, 1943.

MARK NEWMAN, *Primary Examiner.*

RICHARD B. WILKINSON, *Examiner.*

L. M. GOODRIDGE, *Assistant Examiner.*